(12) United States Patent
Conlon et al.

(10) Patent No.: US 9,327,589 B2
(45) Date of Patent: May 3, 2016

(54) HYBRID POWERTRAIN WITH THREE-MODE DEPLETION STRATEGY AND METHOD OF OPERATING A HYBRID POWERTRAIN

(71) Applicant: GM Global Technology Operations LLC, Detroit, MI (US)

(72) Inventors: Brendan M. Conlon, Rochester Hills, MI (US); Steven A. Tarnowsky, West Bloomfield, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 185 days.

(21) Appl. No.: 14/101,699

(22) Filed: Dec. 10, 2013

(65) Prior Publication Data
US 2015/0158373 A1 Jun. 11, 2015

(51) Int. Cl.
*B60K 6/20* (2007.10)
*B60K 6/42* (2007.10)
*B60W 20/00* (2016.01)

(52) U.S. Cl.
CPC ............... *B60K 6/42* (2013.01); *B60W 20/40* (2013.01); *Y10S 903/902* (2013.01)

(58) Field of Classification Search
None
See application file for complete search history.

(56) References Cited

U.S. PATENT DOCUMENTS

| | | | |
|---|---|---|---|
| 7,473,201 B2 * | 1/2009 | Raghavan et al. | 475/5 |
| 7,967,711 B2 | 6/2011 | Conlon et al. | |
| 8,068,947 B2 | 11/2011 | Conlon et al. | |
| 8,083,626 B2 | 12/2011 | Conlon et al. | |
| 8,234,025 B2 | 7/2012 | Conlon et al. | |
| 8,571,739 B2 * | 10/2013 | Fleckner et al. | 701/22 |
| 8,972,148 B2 * | 3/2015 | Nawata et al. | 701/99 |

* cited by examiner

*Primary Examiner* — Redhwan K Mawari
*Assistant Examiner* — Edward Torchinsky
(74) *Attorney, Agent, or Firm* — Quinn Law Group, PLLC (57) ABSTRACT

A hybrid powertrain for propelling a vehicle includes an engine and an energy storage system operatively connected to the engine. Both the engine and the energy storage system are operable for providing power to propel the vehicle. A control system is operatively connected to the engine and the energy storage system and is configured to execute a stored algorithm that determines required energy reserve, remaining energy, and power capability of the energy storage system. The control system commands operation in one of a first operating mode, a second operating mode, and a third operating mode based on the required energy reserve, the remaining energy, and the power capability of the energy storage system.

16 Claims, 5 Drawing Sheets

HYBRID POWERTRAIN WITH THREE-MODE DEPLETION STRATEGY AND METHOD OF OPERATING A HYBRID POWERTRAIN

TECHNICAL FIELD

The present teachings generally include a hybrid powertrain for a vehicle and a method for controlling a hybrid powertrain.

BACKGROUND

Hybrid electric vehicles offer reduced fuel consumption by utilizing an internal combustion engine and one or more electric motor/generators as commanded by an onboard controller programmed to vary use of each of the engine and motor/generators during different driving conditions to achieve peak efficiency.

An extended-range electric vehicle is a hybrid electric vehicle that is designed to provide consistent electric-only drive performance as the energy storage system (ESS) is depleted during drive. The ESS is typically a battery or battery pack for a hybrid electric vehicle. Since ESS power capability varies as a function of the state-of-charge of the ESS during discharge due to the variation of open circuit voltage and cell resistance in the ESS, the ESS must be sized to meet the power requirements at the minimum state-of-charge and lowest temperature at which it is desired that the vehicle is capable of operating in electric-only operating mode. The level of ESS and electric drive power capacity overdesign due to this sizing strategy depends in large part on the amount of variation in battery pack voltage and resistance. Vehicles designed for an increased electric-only operating range may use energy dense batteries, which tend to have an increase in variation in voltage over the battery discharge cycle, and higher resistance.

SUMMARY

A hybrid powertrain for propelling a vehicle includes an engine and an energy storage system operatively connected to the engine. Both the engine and the energy storage system are operable for providing power to propel the vehicle. A control system is operatively connected to the engine and the energy storage system and is configured to execute a stored algorithm that determines required energy reserve, remaining energy, and power capability of the energy storage system. The control system commands operation in one of a first operating mode, a second operating mode, and a third operating mode based on the required energy reserve, the remaining energy, and the power capability of the energy storage system. The first operating mode is an electric-only operating mode in which the engine is off and power from the energy storage system alone propels the vehicle. The second operating mode is a charge-depleting operating mode in which power from the energy storage system propels the vehicle and the engine is on as needed to add power to propel the vehicle when the power capability of the energy storage system is insufficient to provide a predetermined level of power. The third operating mode is a charge-sustaining operating mode in which power from the energy storage system propels the vehicle, the engine is on as needed to add power to propel the vehicle when the power capability of the energy storage system is insufficient to provide the predetermined level of power. The system allows the engine to be on in the third operating mode in order to add energy to the energy storage system at various points during the drive to maintain the desired energy reserve of the energy storage system on a time-average basis. The second and third operating modes allow driving with the engine-off, for short durations and/or low driving power conditions, if predetermined operating constraints are met. A method of operating a hybrid vehicle is carried out by the control system.

The hybrid powertrain and method disclosed herein provide substantially the same electric-only drive behavior, electric-only range, and petroleum displacement as known extended-range electric vehicles, while reducing the ESS power requirement, potentially reducing ESS cost, mass, and volume, and enabling the use of energy dense battery chemistries. The hybrid powertrain provides an electric-only drive experience in the electric-only operating mode, but also provides a similar electric-only feel in the charge-depleting operating mode, as the engine speed is kept relatively low to maintain smooth, quiet acceleration. The hybrid powertrain minimizes engine use while enabling increased electric-only range via higher energy content cells. Consistent vehicle performance may be achieved over ranges of temperatures and states-of-charge of the ESS.

The above features and advantages and other features and advantages of the present teachings are readily apparent from the following detailed description of the best modes for carrying out the present teachings when taken in connection with the accompanying drawings.

DETAILED DESCRIPTION

Figure 1:
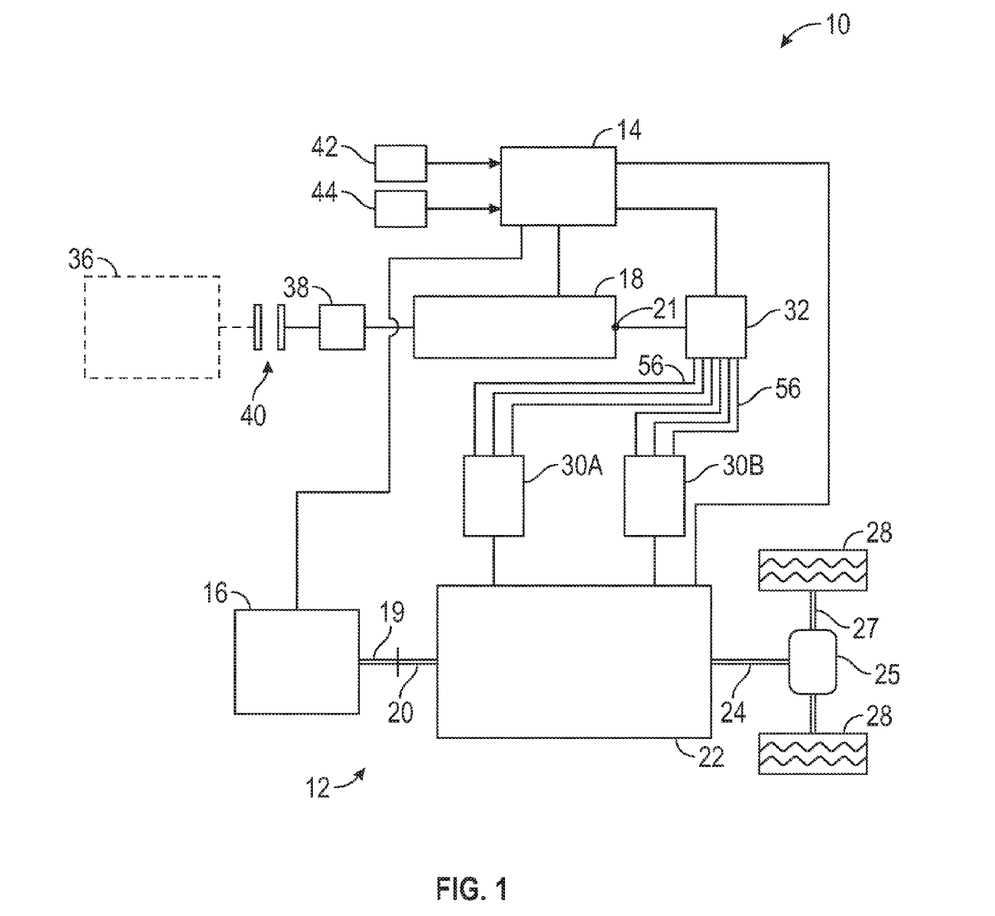
FIG. 1 is a schematic illustration of a vehicle having a hybrid powertrain with an engine and an energy storage system.
Figure 5:
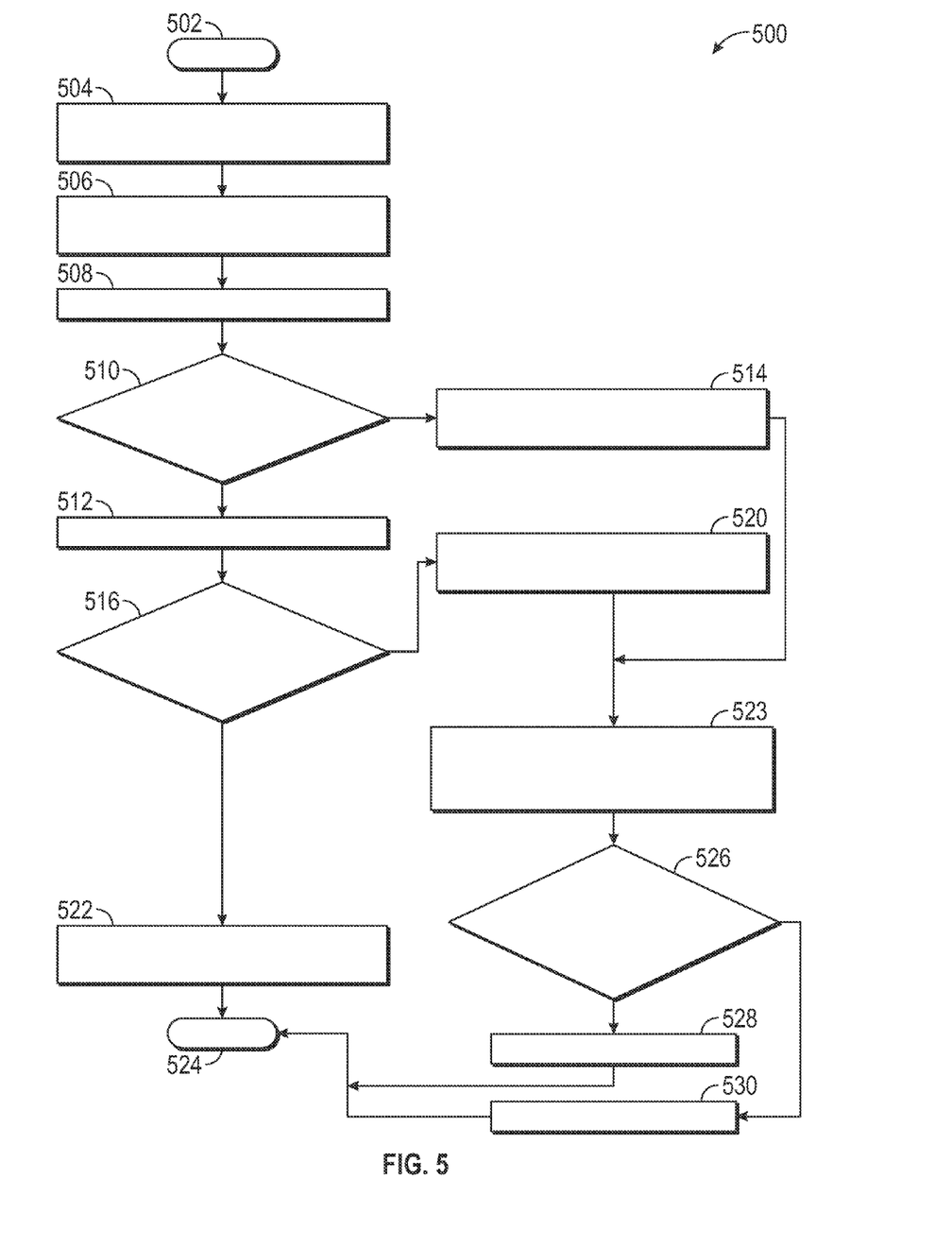
FIG. 5 is a schematic flow diagram of a method of controlling the hybrid powertrain of FIG. 1.
Figure 6:
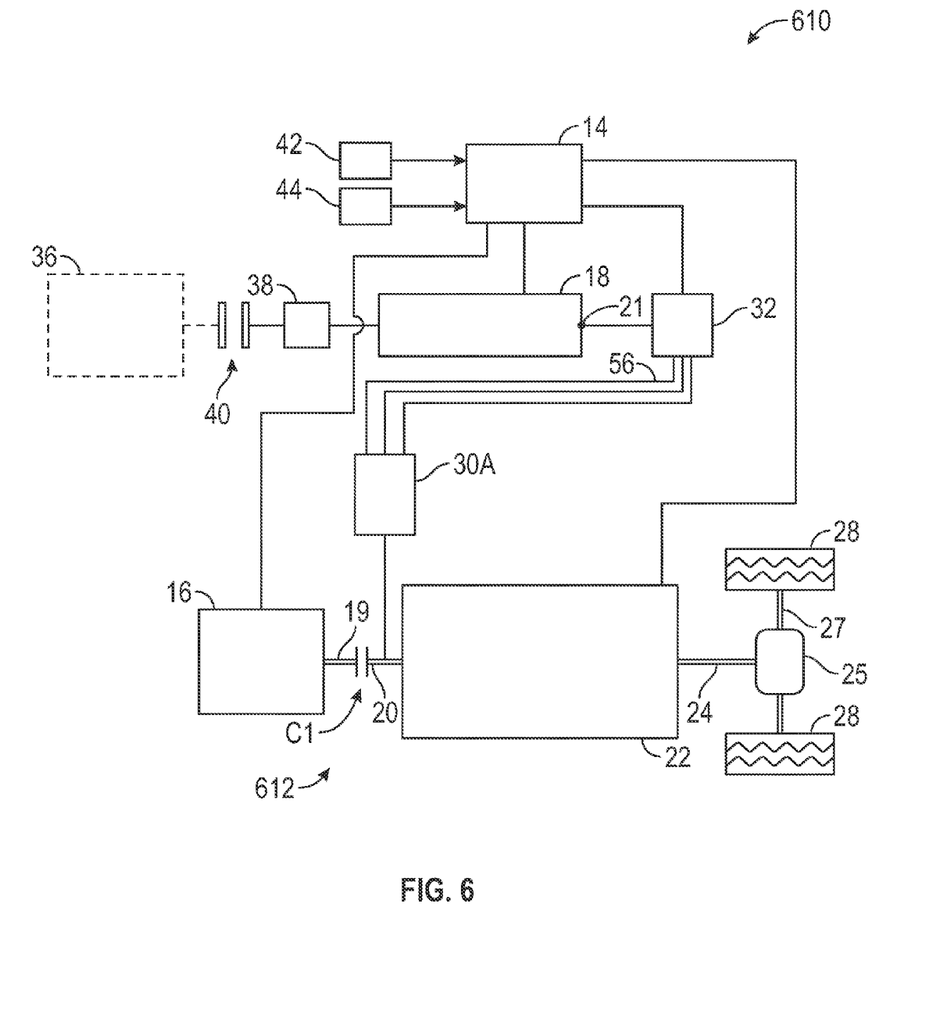
FIG. 6 is a schematic illustration of a vehicle having an alternative hybrid powertrain.
Figure 7:
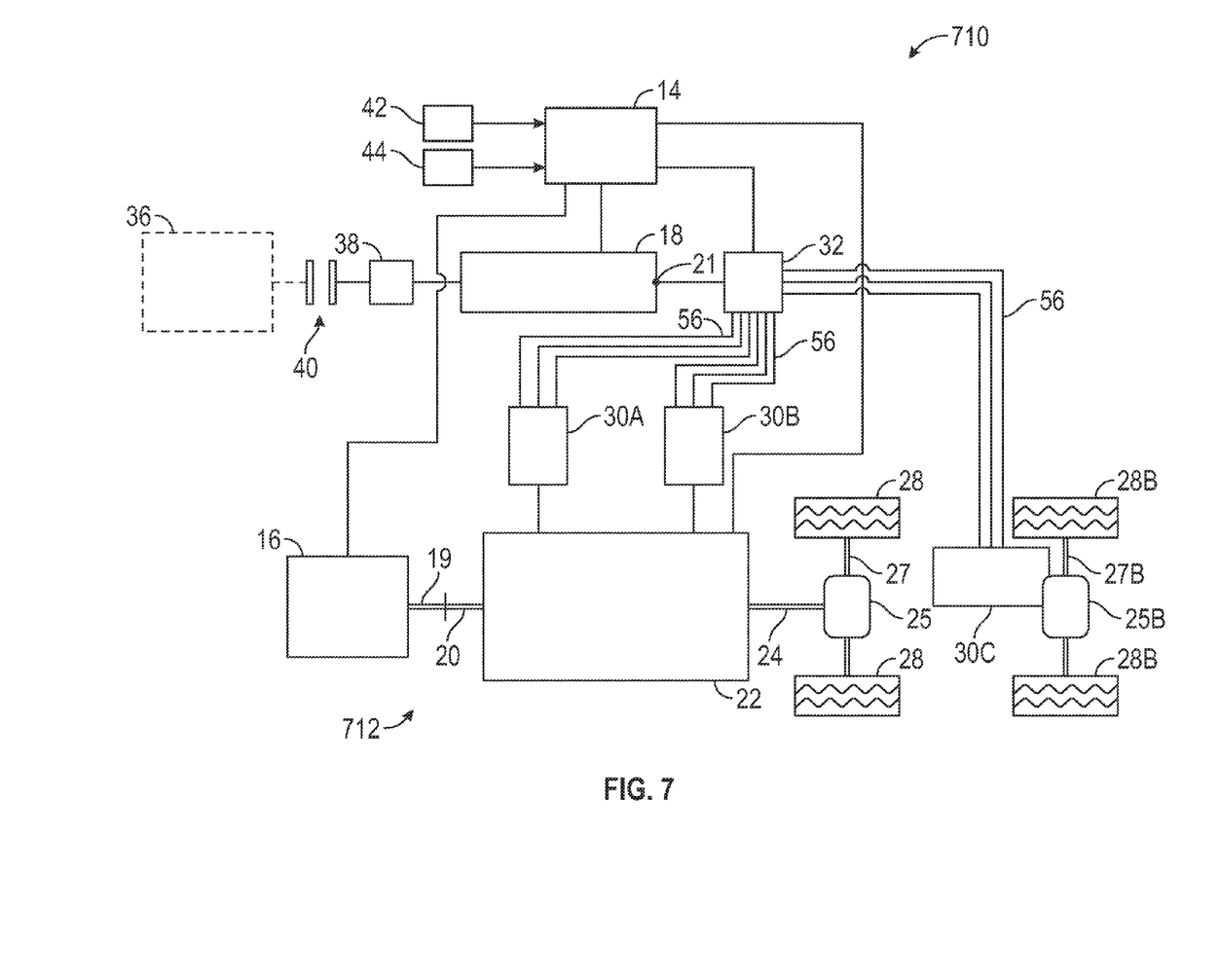
FIG. 7 is a schematic illustration of a vehicle having an alternative hybrid powertrain.

Referring to the drawings, wherein like reference numbers refer to like components throughout the several views, FIG. 1 shows a vehicle 10 that has a hybrid powertrain 12 controlled via a control system 14 to operate according to a three-mode charge depletion strategy described as a method of operating a hybrid powertrain 500 in the flow diagram of FIG. 5. Other embodiments of hybrid powertrains can be controlled according to the method 500, such as described with respect to the vehicle 610 of FIG. 6 and the vehicle 710 of FIG. 7. The powertrain 12 includes an engine 16 that is a first source of power, and an energy storage system (ESS) 18 that is a second source of power. In the embodiment shown, the ESS 18 is one or more batteries, or battery packs, and may be referred to herein as a battery 18. The engine 16 is an internal combustion engine that can be a spark-ignition type engine, a compression ignition type engine, or other type of engine, and can be configured to use one of many different specific fuels, such as gasoline, diesel, or alcohol fuels.

The engine 16 has a crankshaft 19 that is operatively connected to an input member 20 of a transmission 22, either continuously or selectively by engagement of a disconnect clutch. The transmission 22 includes intermeshing gears and selectable torque-transmitting devices to establish a variety of speed ratios between the input member 20 and an output member 24 of the transmission 22. Those skilled in the art will readily understand a variety of gearing arrangements that can be used in the transmission 22, such as planetary gearing arrangements, and layshaft gearing arrangements. The output member 24 is connected via a differential 25 and a drive axle 27 to driven wheels 28. The drive axle 27 may be a front axle or a rear axle. Moreover, the transmission 22, output member 24, and differential 25 could be arranged as a transaxle and packaged together in a single case. Optionally, the control system 14 can be used to control a single motor hybrid powertrain, such as on a vehicle 610 with hybrid powertrain 612 shown in FIG. 6. The powertrain 612 includes an electric motor/generator 30A drivingly connected to the transmission input shaft 20. A clutch C1 is selectively engageable to connect the crankshaft 19 for rotation with the transmission input member 20. The clutch C1 is not engaged during an electric-only operating mode, in which the motor/generator 30A alone provides propulsion power to drive the vehicle 10. Still further, the control system 14 can be used to control an electric all-wheel drive vehicle 710 of FIG. 7 that has a powertrain 712 like that of FIG. 1, but with another motor/generator 30C drivingly connected to a second drive axle 27B through a differential 25B that may include gearing to drive wheels 28B.

The hybrid powertrain 12 includes a first electric motor/generator 30A and a second electric motor/generator 30B that are operatively connected to the transmission 22 and are each controllable to operate as a motor or as a generator. When operated as a motor, the motor/generator 30A or 30B uses electrical energy stored in the ESS 18 to provide mechanical energy to one of the components of the transmission, thus varying the torque and/or speed of the component. When operated as a generator, the motor/generator 30A or 30B uses mechanical energy of one of the components of the transmission 22 to provide electrical energy that is stored in the ESS 18.

A power inverter 32 converts direct current provided by the ESS 18 to alternating current needed to power the motor/generator 30A or 30B to function as a motor, and converts alternating current to direct current to be directed to the ESS 18 when the motor/generator 30A or 30B functions as a generator. In one embodiment, the first motor/generator 30A is selectively operable as a generator when powered by the engine 16 to provide electric power to the second motor/generator 30B. The second motor/generator 30B is selectively operable as a motor when receiving electric power from the ESS 18 or from the first motor/generator 30A. The second motor/generator 30B may also provide regenerative braking during deceleration.

The ESS 18 is configured to be recharged between uses of the vehicle 10 by an offboard power supply 36 via a charging device 38 and a coupling 40. Accordingly, the hybrid powertrain 12 may be referred to as a plug-in hybrid powertrain and the vehicle 10 may be referred to as a plug-in hybrid electric vehicle (PHEV).

An operator input device 42 is operatively connected to the control system 14 and enables a vehicle operator, such as a driver, to select one of multiple available performance modes. The selected performance mode will be indicated as an input signal to the control system 14, and will affect the operation of the hybrid powertrain 12 as described herein. One performance mode is a "mountain mode" that may be selected by the operator such as when the vehicle is traveling over relatively steep terrain. Another performance mode is a "hold mode" that may be selected by the driver when the vehicle 10 is being operated relatively far from a location at which the driver expects to recharge the energy storage device using an offboard power supply 38. The operator input device 42 may be a control panel that includes a touch screen interface, depressible buttons, dials, switches, knobs or other interface features that enable the driver to indicate a desired performance mode.

Other vehicle inputs to the control system 14 include an accelerator input device 44 such as an accelerator pedal or other input mechanism controlled by the vehicle operator to indicate a desired level of acceleration of the vehicle 10. Additional vehicle inputs, such as a brake pedal are not shown but are also operatively connected to the control system 14.

The control system 14 is operatively connected to the engine 16, to the transmission 22, to both of the motor/generator 30A, 30B, to the ESS 18, to the power inverter 32, to the operator input device 42, and to the accelerator pedal 44. The control system 14 may include multiple interconnected electronic controllers or control modules, such as an engine control module, a transmission control module, a motor control module, a battery control module, and a hybrid control module. Alternatively some or all of these modules can be combined into a fewer number of control modules. The control system 14 has a processor with a stored algorithm that carries out the method 500 of FIG. 5 that determines which of three operating modes will be commanded based on predetermined vehicle parameters, operator input, and vehicle operating conditions measured or estimated from input signals provided by sensors, not shown. Portions of the algorithm may thus be carried out by different ones of the control modules, or the entire algorithm may be carried out by one control module if the control system 14 has only one control module or even if the control system 14 has multiple control modules. Other vehicle operating conditions may include temperature of the engine 16, temperature of the energy storage device 18, speed and torque at the crankshaft 19, speed and torque at the output member 24, and engine-off duration.

Each of the motor/generators 30A, 30B has a stator and a rotor. For example, the rotor of the motor/generator 30A may be connected for rotation with a crankshaft 19 of the engine 16, either directly or indirectly through a gear assembly or otherwise such that rotation of the rotor causes rotation of the crankshaft 19 and vice versa. The rotor of the motor/generator 30B is connected for rotation with output member 24, either directly or indirectly through a gearing arrangement such that rotation of the rotor causes rotation of the output member 24.

Both of the stators are grounded to the same or separate stationary members, such as a transmission housing, and are connected by three-phase transfer conductors to the motor controller/power inverter 32. The motor controller/power inverter 32 is also operatively connected to the ESS 18 by transfer conductors 56. The motor controller/power inverter 32 receives control signals from the control system 14, and is configured to convert direct current provided from the ESS 18 into alternating current provided to one or both of the stator, and to convert alternating current provided by either stator into direct current for energy storage in the ESS 18 in response to the controller signals to establish various operating modes of the powertrain 12 as described below.

Figure 2:
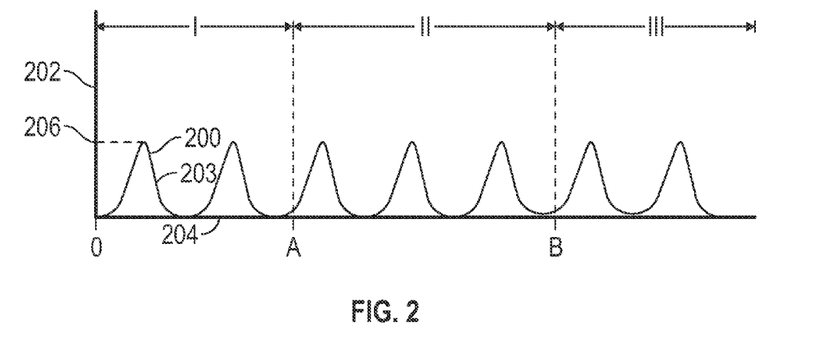
FIG. 2 is a plot of vehicle speed in miles per hour versus time in minutes for one driving schedule of the vehicle of FIG. 1.

FIG. 2 shows a plot 200 of vehicle speed 202 in miles per hour versus time 204 in minutes. In the drive schedule indicated by the plot 200, the driver repeats accelerations of the vehicle 10 by repeatedly moving the accelerator pedal 44 to a fully depressed position for maximum acceleration until a predetermined speed 206 is reached. The driver then releases the accelerator pedal and allows the vehicle speed to return to zero. The accelerations are repeated at relatively equal or identical intervals. According to the method 500 carried out by the control system 14, and as further explained herein, the powertrain 12 is controlled so that from time 0 to time A, the powertrain 12 operates in an electric-only operating mode in which the engine 16 is off and all propulsion power for the vehicle 10 is provided by the ESS 18 through one or both motor/generators 30A, 30B. The electric-only operating mode is indicated as "I" in FIG. 2.

Figure 3:
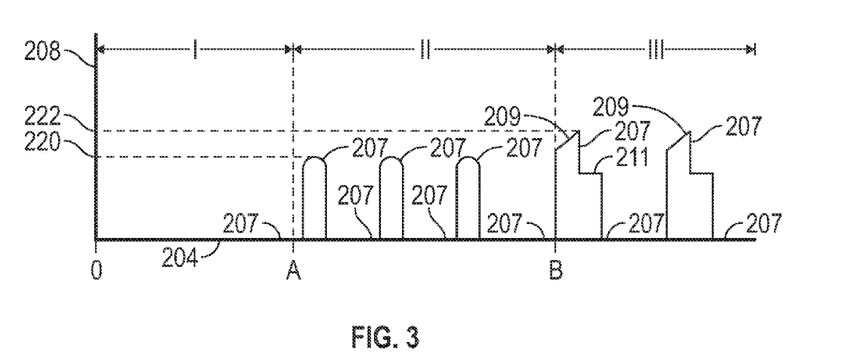
FIG. 3 is a plot of engine speed in revolutions per minute versus time in minutes for the driving schedule of FIG. 2.
Figure 4:
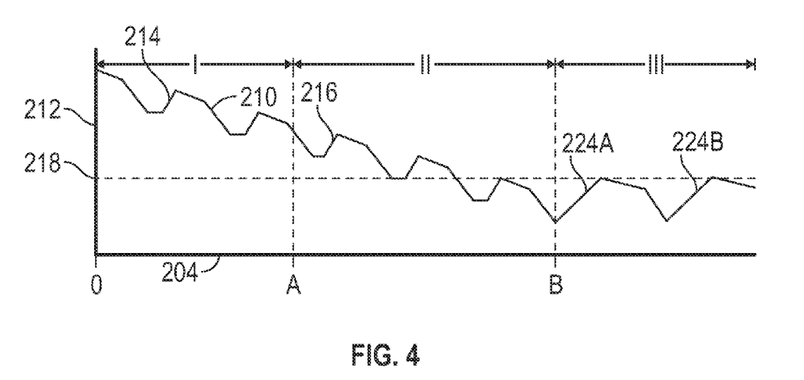
FIG. 4 is a plot of state-of-charge of the energy storage system of FIG. 1 versus time for the driving schedule of FIG. 2.

FIG. 3 is a plot 207 of engine speed 208 in revolutions per minute versus time 204 in minutes. As indicated in FIG. 3, engine speed 208 remains at 0 throughout the electric-only operating mode I. With each acceleration, as time progresses, the remaining battery energy (i.e., the state-of-charge) of the battery and the battery power capability decrease from time 0 to time A. FIG. 4 is a plot 210 of the state-of-charge 212 of the battery 18 versus time 204 in minutes. In FIG. 4, portions of the plot 210 such as indicated at 214 in which the state-of-charge 212 increases after a decrease are due to the second motor/generator 30B being controlled to function as a generator to accomplish regenerative braking, converting some of the rotational energy of the slowing vehicle 10 (as at portion 203 of plot 200 in FIG. 2) into stored energy in the ESS 18.

From time A to time B, the control system 14 controls the powertrain 12 according to the method 500 so that the powertrain 12 operates in a charge-depleting operating mode in which power provided by the ESS 18 is constantly used to propel the vehicle 10 and the engine 16 is controlled to be on to also add power to propel the vehicle 10 when the power capability of the ESS 18 is insufficient to provide a predetermined level of power. The engine 16 may also be commanded to be on during the charge-depleting operating mode if predetermined operating constraints on engine-off operation are not met, as further discussed herein. For example, the system 14 can limit the amount of time that the engine 16 is permitted to remain off, and can command the engine 16 on when vehicle operating conditions, such as catalyst temperature or engine coolant temperature, reach predetermined operating constraints, such as a predetermined minimum temperature. The charge-depleting operating mode is indicated as "II" in FIGS. 2-4. In FIG. 3, the portions of plot 207 where the engine is on during the charge-depleting operating mode II correspond with portions of plot 200 indicating positive acceleration in FIG. 2. FIG. 4 shows that the state-of-charge 212 of the ESS 18 continues to decrease during the charge-depleting operating mode II, with the state-of-charge 212 increasing after a decrease (such as at portion 216) due to the second motor/generator 30B being controlled to function as a generator to accomplish regenerative braking, converting some of the rotational energy of the slowing vehicle 10 into stored energy in the ESS 18.

After time B, the control system 14 controls the powertrain 12 according to the method 500 so that the powertrain 12 operates in a charge-sustaining operating mode III in which power from the ESS 18 is continuously used to propel the vehicle 10, the engine 16 is on to add power to propel the vehicle 10 when the power capability of the battery 18 is insufficient to provide a predetermined level of power, and the engine 16 is also on to add energy to the battery 18 when the remaining energy of the ESS 18 is less than a required energy reserve. The engine 16 may also be commanded to be on during the charge-sustaining operating mode if predetermined operating constraints on engine-off operation are not met, as further discussed herein. For example, the system 14 can limit the amount of time that the engine 16 is permitted to remain off, and can command the engine 16 on when vehicle operating conditions, such as catalyst temperature or engine coolant temperature, reaches a predetermined operating constraint, such as a predetermined minimum temperature. In FIG. 3, portions 209 of the plot 207 indicate an increasing engine speed consistent with supplementing the ESS 18 in providing sufficient power to meet the acceleration demand indicated in FIG. 2. As is apparent in FIG. 3, the engine 16 is controlled to remain on during portion 211 of the plot 207 even after power demands are met to increase the average charging over time enabling the net trend of state-of-charge 212 of the ESS 18 to be charge-neutral (neither charging nor discharging). Recharging of the ESS 18 to sustain a state-of-charge 218 is indicated at portions 224A, 224B of the plot 210 in FIG. 4.

In FIG. 3, the engine speed varies between 0 and the speed at 220 during the charge-depleting mode II, and varies over a higher range of speeds, between 0 and the speed at 222, during the charge-sustaining mode III. Operating the engine 16 over a lower range of speeds during the charge-depleting mode II allows the powertrain 12 to maintain a quieter feel associated with the electric-only operating mode I.

Under the method 500, the transition from mode I to mode II at time A, and from mode II to mode III at time B is dependent on vehicle operating conditions, including conditions of the ESS 18, as discussed with respect to FIG. 5. The method starts at 502, which may be initiated by the key-on ignition position. The method 500 proceeds to step 504, in which the control system 14 determines whether there is a driver-selected performance mode. In the embodiment of the vehicle 10 shown, the drive-selected performance modes available are a "hold mode" and a "mountain mode" as discussed above. Selection of either of these modes will allow the control system 14 to apply a correct predetermined parameter or command while carrying out the method 500, such as the determination of required ESS energy reserve in step 506. Additional battery energy reserve may be required to accommodate specific situations, depending on vehicle feature content. For example, the mountain mode may be selected by the driver to indicate that vehicle 10 is or will soon be climbing a grade. The mountain mode would increase the required ESS energy reserve in order to allow power to be sustained while climbing grades. As another example, the hold mode may be selected by the driver to allow the driver to operate in charge-sustaining operating mode until reaching a location within a predetermined distance from an offboard power supply 36 for recharging of the battery 18, such as a predetermined electric-only zone or neighborhood. In the hold mode, the control system 14 would temporarily set the required ESS energy reserve to the currently remaining ESS energy, thereby maintaining a charge-neutral SOC trend while the hold mode is active. If no specific performance mode is selected by the driver, then a default standard performance mode is used and the control system 14 carries out the steps of the method 500 applying predetermined values associated with the standard performance mode.

In step 506, the control system 14 determines a required ESS energy reserve. The required ESS energy reserve is also referred to as a minimum ESS energy reserve. The determination may be a calculation carried out by the control system 14. The minimum ESS energy reserve must be sufficient to allow the vehicle 10 to provide reasonable duration of maximum acceleration performance and is therefore a function of the engine power and discharge power of the ESS 18 allowed during acceleration. Engine power and discharge power may vary with temperature or other vehicle operating conditions. Accordingly, the minimum ESS energy reserve may be calculated based on various vehicle operating inputs to the control system, 14. The energy reserve determines the sustained acceleration capability of the vehicle 10, whereas the available power determines the peak capability. Plug-in hybrid electric (PHEV) vehicles such as vehicle 10 use combined engine and battery power to provide better performance than the engine alone would provide. The energy reserve is needed to ensure that the performance is robust and does not fade quickly due to depleting the ESS 18.

The method 500 then proceeds to step 508, in which the control system 14 determines the remaining ESS energy. The remaining ESS energy is calculated according to various vehicle operating conditions, including battery operating conditions. For example, if the ESS 18 is a battery, remaining energy is generally a function of state-of-charge, cell age, and cell temperature. A person skilled in the art would readily know and understand the mathematical formula by which remaining ESS energy as defined herein can be calculated. Because ESS energy varies during vehicle operation, and may increase as well as decrease, remaining ESS energy is calculated periodically as the method 500 continuously repeats during vehicle operation, as indicated in FIG. 4.

Following step 508, the method 500 proceeds to step 510 in which the control system 14 determines whether the remaining ESS energy determined in step 508 is greater than the required ESS energy reserve determined in step 506. If the remaining ESS energy is greater than the required ESS energy reserve, then the method 500 can proceed to step 512 to continue a determination whether the electric-only operating mode or the charge-depleting operating mode is to be commanded. If, however, the remaining energy reserve is not greater than the required energy reserve, then the vehicle 10 is operated in the charge-sustaining operating mode III, which is commanded in step 514, and in which power from the ESS 18 propels the vehicle 10, and the engine 16 is on to add power to propel the vehicle 10 when the power capability of the ESS 18 is insufficient to provide the predetermined level of power, such as is indicated at portions 209 of the plot 207 in FIG. 3, and to add energy to the ESS 18 when the remaining energy of the ESS 18 is less than the required energy reserve, such as is indicated at both portions 207 and 211. The engine 16 may also be controlled to be on during the charge-sustaining operating mode III if certain operating constraints on engine-off operation are not met, as discussed with respect to steps 523, 526, and 528.

If the method 500 has proceeded to step 512, then the control system 14 determines the ESS power capability. In this step, the present ESS power capability may be a calculated value. If the ESS 18 is a battery, power capability is generally a function of state-of-charge, cell age, and cell temperature. Power capability is defined as the ability to deliver a specified power at the ESS terminal 21 at a specified current and for a specified time, and therefore is determined by the characteristic of voltage versus load and time. Since power capability varies during vehicle operation, and may increase as well as decrease, ESS power capability is calculated periodically as the method 500 continuously repeats during vehicle operation, as indicated in FIG. 4. A person skilled in the art would readily know and understand the mathematical formula by which power capability as defined herein can be calculated.

Next, in step 516, the control system 14 determines whether the ESS power capability calculated in step 512 is greater than a predetermined level of power. The predetermined level of power is a value determined during powertrain design that is sufficient to provide a desired performance level. Accordingly, a different predetermined level of power could be considered by the control system 14 in making the determination of step 516 depending on if the vehicle 10 is operating in the default, standard performance mode or if the vehicle 10 is operating in another driver-selected mode that requires a different level of power.

If the ESS power capability is determined to be greater than the appropriate predetermined level of power in step 516, the method 500 proceeds to step 522 and commands operation in the electric-only operating mode I. The electric-only operating mode is the default operating mode of the vehicle 10, and is selected if the required ESS power and remaining ESS energy targets are met. In electric-only operating mode, the vehicle 10 is capable of full performance without starting the engine 16. In other words, the vehicle 12 operates electrically up to 100% power demand from the driver. In this mode, the ESS power capability decreases slowly as the ESS is discharged, until a point where the power requirement is not met and the vehicle 10 must transition to charge-depleting mode. Because the power decrease is slow and predictable from a battery state-of-charge depletion rate, the engine 16 will remain off and therefore no constraints are needed on engine-off duration to maintain a warm engine catalyst or coolant temperature. Following step 522, the method 500 moves to block 524 to return to the start at 502 to continuously repeat the method 500 as the vehicle 10 is operating.

If ESS power capability is not greater than the appropriate predetermined level of power in step 516, then the method 500 proceeds to step 520 in which the control system 14 commands the powertrain 12 to operate in the charge-depleting operating mode II of FIGS. 2-4. In general, during charge-depleting operating mode, the control system 14 commands a start of the engine 16 when needed to satisfy the power demanded by the driver, in order to maintain a consistent level of performance and maximize the charge depletion rate of the ESS 18, thereby prioritizing the use of electrical energy from the off-board power supply 36 over fuel. In other words, in the charge-depleting operating mode, power from the ESS 18 is continuously used to propel the vehicle 10, and the engine 16 is commanded on to add power to propel the vehicle 10 when the power capability of the ESS 18 is insufficient to provide a predetermined level of power determined by the selected (or default) performance mode. The engine 16 may also be controlled to be on during the charge-depleting operating mode 11 if certain operating constraints on engine-off operation are not met, as discussed with respect to steps 523, 526, and 528.

During a typical discharge cycle, the vehicle 10 will transition through the three modes sequentially as state-of-charge of the ESS 18 decreases. That is, the powertrain 12 will first be commanded to operate in the electric-only operating mode I, then in the charge-depleting operating mode II, and finally in the charge-sustaining operating mode III, assuming the vehicle 10 is not recharged by the offboard power supply 36 prior to reaching the charge-sustaining operating mode III.

When operating during either the charge-depleting operating mode II or the charge-sustaining operating mode III, an engine start may be required at any point based on power demanded by the driver. In order to ensure immediate availability of an engine start, additional predetermined engine-off operating constraints limiting engine-off operation may be needed to heat or maintain the temperature of the engine catalyst or coolant. These constraints may take the form of limits on the time the system allows the engine 16 to remain off, or may incorporate feedback from various sensors and/or estimators so that the control system 14 commands the engine 16 to start whenever a vehicle operating condition, such as catalyst temperature, reaches a specified limit. Accordingly, following each of steps 514 and 520, the method 500 proceeds to step 523 to determine the current values of vehicle operating conditions having predetermined operating constraints on engine-off operation, and then to step 526 in which the control system 14 compares the current values to the engine-off operating constraints. For example, if the current value of a catalyst temperature is determined to be below a predetermined minimum catalyst temperature (i.e., an engine-off operating constraint) or the current temperature of engine coolant is below a predetermine minimum coolant temperature, then the engine 16 must be commanded on in order to satisfy the predetermined operating constraint. Therefore, if it is determined in step 526 that the current values of vehicle operating conditions having engine-off operating constraints do not satisfy the engine-off operating constraints, then the method 500 proceeds to step 528, and the control system 14 commands a start of the engine 16 to switch to engine-on operation while still remaining in the respective charge-depleting or charge-sustaining operating mode. The method 500 then proceeds to block 524 to return to the start at 502. The engine 16 may then remain on for a predetermined period of time or until the engine catalyst and/or engine coolant are sufficiently heated to another predetermined operating constraint, such as a maximum temperature.

If it is determined in step 526 that the current values of parameters having engine-off operating constraints satisfy the constraints, then the method 500 proceeds from step 526 to step 530, and allows the engine 16 to turn off if it had been on, assuming operator demands are met. The method 500 then proceeds to block 524 to return to the start at 502.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A hybrid powertrain for propelling a vehicle comprising:
   an engine;
   an energy storage system operatively connected to the engine;
   wherein both the engine and the energy storage system are operable for providing power to propel the vehicle;
   a control system operatively connected to the engine and the energy storage system and configured to execute a stored algorithm that:
      determines required energy reserve, remaining energy, and power capability of the energy storage system; and
      commands operation in one of a first operating mode, a second operating mode, and a third operating mode based on the required energy reserve, the remaining energy, and the power capability of the energy storage system;
   wherein in the first operating mode the engine is off and power from the energy storage system alone propels the vehicle;
   wherein in the second operating mode power from the energy storage system propels the vehicle and the engine is on to add power to propel the vehicle when the power capability of the energy storage system is insufficient to provide a predetermined level of power;
   wherein in the third operating mode power from the energy storage system propels the vehicle, and the engine is on to add power to propel the vehicle when the power capability of the energy storage system is insufficient to provide the predetermined level of power, and the engine is on to add energy to the energy storage system when the remaining energy of the energy storage system is less than the required energy reserve; and
   wherein the engine is controlled to run at a first range of speeds in the second operating mode, and to run at a second range of speeds higher than the first range of speeds in the third operating mode.

2. The hybrid powertrain of claim 1, wherein the hybrid powertrain has multiple driver-selectable performance modes different than the first, the second, and the third operating modes and that may be carried out during the first, the second, and the third operating modes; and wherein the stored algorithm:
   determines which of the performance modes has been selected; and
   sets the required energy reserve dependent on the performance mode selected.

3. The hybrid powertrain of claim 1, wherein during the second and third operating modes, the stored algorithm:
   determines current values of vehicle operating conditions having predetermined engine-off operating constraints;
   compares the current values to the engine-off operating constraints; and
   commands engine-on operation if the current values do not satisfy the engine-off operating constraints.

4. The hybrid powertrain of claim 1, wherein the energy storage system includes a rechargeable battery with a chemical energy reserve and having a state-of-charge dependent on the remaining energy of the chemical energy reserve.

5. The hybrid powertrain of claim 1, wherein the powertrain further comprises:
   a transmission having a transmission input member and a transmission output member; and
   at least one motor/generator operatively connected to the energy storage system and configured to propel the vehicle.

6. The hybrid powertrain of claim 5, wherein the motor/generator is configured to provide driving power to the transmission input member to propel the vehicle.

7. The hybrid powertrain of claim 5, wherein the motor/generator is configured to provide driving power to rear wheels of the vehicle.

8. A hybrid powertrain for propelling a vehicle comprising:
   an engine;
   an energy storage system having a battery configured for recharging by an external power source;
   a transmission operatively connected to the engine; wherein both the engine and the energy storage system are operable to provide power to propel the vehicle;
   a control system operatively connected to the engine and the energy storage system and configured to execute a stored algorithm that:
      determines required energy reserve, remaining energy, and power capability of the battery; and
      commands operation in one of an electric-only operating mode, a charge-depleting operating mode, and a charge-sustaining operating mode based on the required energy reserve, the remaining energy, and the power capability of the battery;
   wherein in the electric-only operating mode the engine is off and power from the battery alone propels the vehicle, the power capability of the battery is sufficient to meet a predetermined level of power, and the remaining energy of the battery is greater than the required energy reserve;

wherein in the charge-depleting operating mode power from the battery propels the vehicle, the engine is on to add power to propel the vehicle when the power capability of the battery is insufficient to provide a predetermined level of power, and the remaining energy of the battery is greater than the required energy reserve;

wherein in the charge-sustaining operating mode power from the battery propels the vehicle, the engine is on to add power to propel the vehicle when power capability of the battery is insufficient to provide a predetermined level of power, and the engine is on to recharge the battery when the remaining energy of the battery is less than the required energy reserve;

wherein the hybrid powertrain has multiple driver-selectable performance modes different than the electric-only operating mode, the charge-depleting operating mode, and the charge-sustaining operating mode and that may be carried out during the electric-only operating mode, the charge-depleting operating mode, and the charge-sustaining operating mode; and wherein the stored algorithm:
 determines which of the performance modes has been selected; and
 sets the required energy reserve dependent on which performance mode has been selected.

9. The hybrid powertrain of claim 8, wherein the engine is controlled to operate at a first range of engine speeds in the charge-depleting operating mode, and to run at a second range of engine speeds higher than the first range of speeds in the charge sustaining operating mode.

10. The hybrid powertrain of claim 8, wherein during the second and third operating modes, the stored algorithm:
 determines current values of vehicle operating conditions having predetermined engine-off operating constraints;
 compares the current values to the engine-off operating constraints; and
 commands engine-on operation if the current values do not satisfy the engine-off operating constraints.

11. The hybrid powertrain of claim 8, wherein the battery has a chemical energy reserve and a state-of-charge dependent on the remaining energy of the chemical energy reserve.

12. The hybrid powertrain of claim 8, wherein the transmission has a transmission input member and a transmission output member; wherein the powertrain further comprises:
 a motor/generator operatively connected to the energy storage system and configured to provide driving power to the transmission input member to propel the vehicle.

13. The hybrid powertrain of claim 8, wherein the transmission has a transmission input member and a transmission output member; wherein the powertrain further comprises:
 a motor/generator operatively connected to the energy storage system and configured to provide driving power to rear wheels of the vehicle.

14. A method of operating a hybrid powertrain having an engine and an energy storage system both operable for providing power for propelling a vehicle, the method comprising:

determining via a control system required energy reserve, remaining energy, and power capability of the energy storage system;

commanding via the control system operation in one of a first operating mode, a second operating mode, and a third operating mode based on the required energy reserve, the remaining energy, and the power capability of the energy storage system;

wherein in the first operating mode the engine is off and power from the energy storage system alone propels the vehicle;

wherein in the second operating mode power from the energy storage system propels the vehicle and the engine is on to add power to propel the vehicle when the power capability of the energy storage system is insufficient to provide a predetermined level of power;

wherein in the third operating mode power from the energy storage system propels the vehicle, the engine is on to add power to propel the vehicle when the power capability of the energy storage system is insufficient to provide the predetermined level of power, and the engine is on to add energy to the energy storage system when the remaining energy of the energy storage system is less than the required energy reserve;

determining which one of multiple driver-selectable performance modes has been selected; wherein the performance modes are different than the first, the second, and the third operating modes and may be carried out during the first, the second, and the third operating modes;

setting the required energy reserve dependent on the performance mode selected;

controlling the engine to run at a first range of engine speeds in the second operating mode; and controlling the engine to run at a second range of engine speeds higher than the first range of engine speeds in the third operating mode.

15. The method of claim 14, wherein during the second operating mode, the stored algorithm:
 determines current values of vehicle operating conditions having predetermined engine-off operating constraints;
 compares the current values to the engine-off operating constraints; and
 commands engine-on operation if the current values do not satisfy the engine-off operating constraints.

16. The method of claim 14, wherein during the third operating mode, the stored algorithm:
 determines current values of vehicle operating conditions having predetermined engine-off operating constraints;
 compares the current values to the engine-off operating constraints; and
 commands engine-on operation if the current values do not satisfy the engine-off operating constraints.

* * * * *